US011480270B2

(12) United States Patent
Manas-Zloczower et al.

(10) Patent No.: US 11,480,270 B2
(45) Date of Patent: *Oct. 25, 2022

(54) LOW PERMEATION FUEL HOSE

(71) Applicant: Eaton Intelligent Power Limited, Dublin (IE)

(72) Inventors: Iani Manas-Zloczower, Orange, OH (US); Colleen Marie Hathaway, Dundee, MI (US)

(73) Assignee: Eaton Intelligent Power Limited, Dublin (IE)

( * ) Notice: Subject to any disclaimer, the term of this patent is extended or adjusted under 35 U.S.C. 154(b) by 573 days.

This patent is subject to a terminal disclaimer.

(21) Appl. No.: 16/599,884

(22) Filed: Oct. 11, 2019

(65) Prior Publication Data

US 2020/0158266 A1 May 21, 2020

Related U.S. Application Data

(63) Continuation of application No. 15/826,428, filed on Nov. 29, 2017, now Pat. No. 10,487,966, which is a continuation of application No. 14/613,801, filed on Feb. 4, 2015, now Pat. No. 9,857,001.

(60) Provisional application No. 61/935,456, filed on Feb. 4, 2014.

(51) Int. Cl.
| | |
|---|---|
| *B29C 48/09* | (2019.01) |
| *F16L 11/08* | (2006.01) |
| *F16L 11/12* | (2006.01) |
| *F16L 11/04* | (2006.01) |
| *B29B 7/00* | (2006.01) |
| *B29B 9/06* | (2006.01) |
| *B29C 48/285* | (2019.01) |
| *B29C 48/78* | (2019.01) |

(Continued)

(52) U.S. Cl.
CPC .............. *F16L 11/08* (2013.01); *B29B 7/007* (2013.01); *B29B 9/06* (2013.01); *B29C 48/09* (2019.02); *B29C 48/288* (2019.02); *B29C 48/78* (2019.02); *F16L 11/04* (2013.01); *F16L 11/12* (2013.01); *B29K 2101/12* (2013.01); *B29K 2105/0088* (2013.01); *B29K 2105/251* (2013.01)

(58) Field of Classification Search
CPC ............ B29C 48/09; F16L 11/04; F16L 11/12
See application file for complete search history.

(56) References Cited

U.S. PATENT DOCUMENTS

| | | |
|---|---|---|
| 3,411,981 A | 11/1968 | Thomas |
| 4,666,960 A | 5/1987 | Spain |
| 5,398,729 A | 3/1995 | Spurgat |

(Continued)

FOREIGN PATENT DOCUMENTS

WO 00/59999 10/2000

OTHER PUBLICATIONS

Eaton 35FH Hose E-HOEN-MR001-E3, Eaton, pp. 1-4 (Aug. 2014).

(Continued)

*Primary Examiner* — James Sanders
(74) *Attorney, Agent, or Firm* — Merchant & Gould, P.C.

(57) ABSTRACT

Low permeation fuel hose is provided comprising an outer cover layer prepared from a composition comprising a polyvinyl chloride (PVC), a thermoplastic copolyester elastomer and, optionally, a thermoplastic polyurethane (TPU), wherein the hose exhibits improved low and high temperature performance compared to conventional fuel hoses having an outer layer consisting of industrial grade PVC.

19 Claims, 4 Drawing Sheets

(51) Int. Cl.
*B29K 101/12* (2006.01)
*B29K 105/00* (2006.01)

(56) References Cited

U.S. PATENT DOCUMENTS

| | | |
|---|---|---|
| 5,985,392 A | 11/1999 | Hert et al. |
| 6,089,277 A | 7/2000 | Kodama |
| 6,287,411 B1 | 9/2001 | Kelley |
| 6,391,963 B1 | 5/2002 | Nishiyama |
| 8,092,881 B2 | 1/2012 | Garver et al. |
| 9,857,001 B2 | 1/2018 | Manas-Zloczower |
| 2003/0098085 A1 | 5/2003 | Ito et al. |
| 2004/0134555 A1 | 7/2004 | Powell |
| 2004/0142135 A1 | 7/2004 | Venshuere |
| 2005/0208247 A1 | 9/2005 | Backman et al. |
| 2006/0057915 A1 | 3/2006 | Leucht |
| 2006/0099368 A1 | 5/2006 | Park |
| 2006/0108790 A1 | 5/2006 | Powell |
| 2007/0119511 A1 | 5/2007 | Donohue |
| 2008/0185063 A1 | 8/2008 | Bieszczad et al. |
| 2008/0254281 A1 | 10/2008 | Chen et al. |
| 2008/0311329 A1 | 12/2008 | Inaba |
| 2010/0036201 A1 | 2/2010 | Ogura |
| 2010/0173109 A1 | 7/2010 | Okabe et al. |
| 2010/0224276 A1 | 9/2010 | Forrester et al. |
| 2010/0300571 A1 | 12/2010 | Miller et al. |
| 2011/0114215 A1 | 5/2011 | Jeruzal et al. |
| 2011/0226375 A1 | 9/2011 | Harris et al. |
| 2012/0053568 A1 | 3/2012 | Hawkins |
| 2012/0070599 A1 | 3/2012 | Zamore |
| 2013/0291989 A1 | 11/2013 | Gray et al. |

OTHER PUBLICATIONS

Eaton Weatherhead Hose Assembly Master Catalog W-HYOV-MC002-E3, pp. E-1-E-6 (Feb. 2011).
Elastollan® TPU Technical Data Sheet Elastollan® 1185A, BASF, 4 pages.
Geon™ Vinyl Flexible A75M1 Trans 9000 Technical Data Sheet, PolyOne, 2 pages (2013).
Hytrel® 4056 Product Information, DuPont, pp. 1-4 (2005).
Hytrel® Rheology and Handling, Product Information, DuPont, pp. 1-7 (Nov. 1993).
Kynar® & Hynar Flex® PVDF Performance Characteristics & Data, Arkema Inc., pp. 1-16 (Copyright 2009).
Texin 285 Product Data Sheet, Bayer Material Science LLC, pp. 1-9 (2010).
Thomas, S. et al., "Extrudate Morphology of Blends of Plasticized Poly(vinyl Chloride) and Thermoplastic Copolyester Elastomer," Journal of Applied Polymer Science, vol. 34, pp. 2053-2061 (1987).

Copolyester Concentration Ranges

PVC Concentration Ranges

LOW PERMEATION FUEL HOSE

CROSS REFERENCE TO RELATED APPLICATION

This application is a continuation application of U.S. application Ser. No. 15/826,428, filed Nov. 29, 2017, issued as U.S. Pat. No. 10,487,966 on Nov. 26, 2019, which is a continuation application of U.S. application Ser. No. 14/613,801, filed Feb. 4, 2015, issued as U.S. Pat. No. 9,857,001 on Jan. 2, 2018, which claims the benefit of U.S. provisional application No. 61/935,456, filed Feb. 4, 2014, each of Which is hereby incorporated herein by reference in its entirety.

FIELD

Low permeation fuel hose is provided comprising an outer cover layer prepared from a composition comprising a polyvinyl chloride (PVC), a copolyester and, optionally, a polyurethane (TPU), wherein the hose exhibits improved low and high temperature performance compared to conventional fuel hoses having an outer layer consisting of industrial grade PVC. In one embodiment, a marine fuel hose is provided that exhibits the ability to self-extinguish flames.

BACKGROUND

Low permeation fuel hose must meet certain government standards, for example, with respect to permeation rating. The term "permeation rating" refers to the quantity of fuel which will pass through the walls of the hose when filled with fuel.

USCG Type B1-15 hose refers to hose that meets SAE J1527 performance standards and require that the fuel hose does not exceed a permeation rating of 15 g or less of fuel loss per square meter of interior surface area in 24 hours, 15 $g/m^2/24$ h, with CE fuel at 23° C. as specified in SAE J1527 for marine fuel hoses.

In the past fuel hoses have commonly been manufactured with an outer layer prepared from a composition consisting essentially of PVC. Unfortunately, over time and exposure to high humidity, traditional fuel hoses with an outer jacket consisting essentially of PVC can suffer delamination, in particular when subjected to extreme low and or high temperature conditions.

It would be beneficial to provide a fuel hose that meets all of the performance requirements over time under high humidity, low and high temperature conditions and utilizes materials that are cost effective and widely available.

Alternative hose composition constructions have been explored in order to improve low and high temperature characteristics and to improve manufacturing efficiencies.

SUMMARY

A low permeation fuel hose is provided comprising a hose body with at least one layer formed from a composition comprising a thermoplastic copolyester elastomer, and a polyvinyl chloride (PVC).

In another embodiment, a fuel hose is provided comprising a hose body comprising at least one layer formed from a composition comprising a thermoplastic copolyester elastomer; a polyvinyl chloride (PVC), and a thermoplastic polyurethane (TPU).

In some embodiments, the fuel hose is capable of meeting the performance requirements of SAE J1527-B1.

In some embodiments, a fuel hose is provided that does not exceed a permeation rating of 15 g or less of fuel loss per square meter of interior surface area in 24 hours, 15 $g/m^2/24$ h, with CE fuel at 23° C. as specified in SAE J1527-B1.

In some embodiments, a fuel hose is provided that meets and/or exceeds the criteria of the flammability test according to SAE J1527-B1, and exhibits the ability to self-extinguish flames in not more than an average of 60 seconds, 40 seconds, or 30 seconds.

In one aspect, at least one layer is an outer cover layer. In another aspect, the hose body comprises reinforcement. In a further aspect, the fuel hose has a multi-layer construction.

In one embodiment, a fuel hose is provided comprising a hose body comprising at least one layer formed from a composition comprising a thermoplastic copolyester elastomer; and a polyvinyl chloride (PVC), wherein the composition comprises about 5-75 wt % by weight of the copolyester, and 25-95 wt % PVC. In one aspect, the composition comprises about 10-60 wt % by weight copolyester, and 45-85 wt % PVC. In another aspect, the composition comprises about 15-50 wt % by weight copolyester, and 60-80 wt % PVC.

In another embodiment, a fuel hose is provided comprising a hose body comprising at least one layer formed from a composition comprising a thermoplastic copolyester elastomer; a polyvinyl chloride (PVC), and a thermoplastic polyurethane (TPU), wherein the composition comprises about 5-75 wt % by weight copolyester, 25-95 wt % PVC, and 5-35 wt % TPU. In one aspect, the composition comprises about 10-60 wt % by weight copolyester, 45-85 wt % PVC, and 10-30 wt % TPU. In another aspect, the composition comprises about 10-20 wt % by weight copolyester, 60-70 wt % PVC, and 15-25 wt % TPU.

In some embodiments, a composition is provided for the preparation of a low permeation fuel hose, wherein the composition is a PVC blend, alloy or copolymer. In one embodiment, the composition is a PVC alloy.

DETAILED DESCRIPTION

Low permeation fuel hose is provided comprising an outer cover layer prepared from a composition comprising a polyvinyl chloride (PVC), a copolyester and, optionally, a polyurethane (TPU), wherein the hose exhibits improved low and high temperature performance compared to conventional fuel hoses having an outer layer consisting of industrial grade PVC. In one embodiment, a marine fuel hose is provided that exhibits the ability to self-extinguish flames.

In some embodiments, low permeation fuel hose is provided that is CARB approved and conforms to parts of SAE J1527, B1 and SAE J30 R6, R9 and R11 specification. Applications include fuel delivery lines for small engines, petroleum-based chemicals, bio-diesel fuel to 100% and marine fuel lines. In some embodiments, low permeation fuel hose is provided that does not exceed 15 g/m$^2$ (0.003 lb/sq. ft.) per day when subjected to SAE J1527-B1 permeation test methods with CE10 fuel. In one embodiment, a low permeation fuel hose is provided that meets SAE specifications and that exhibits improved bonding between the jacket, or outer cover layer, and the outer core of the hose.

In some embodiments, an EPA fuel hose is provided suitable for use in marine fuel systems. In other embodiments, material compositions are provided for making one or more layers of the fuel hose. In particular, the present application relates to materials suitable for use in preparing a USCG Type B1-15 marine fuel hose.

In some embodiments, a fuel hose is provided comprising a multiplicity of layers selected from two or more layers, three or more layers, four or more layers or five or more layers.

Figure 1:
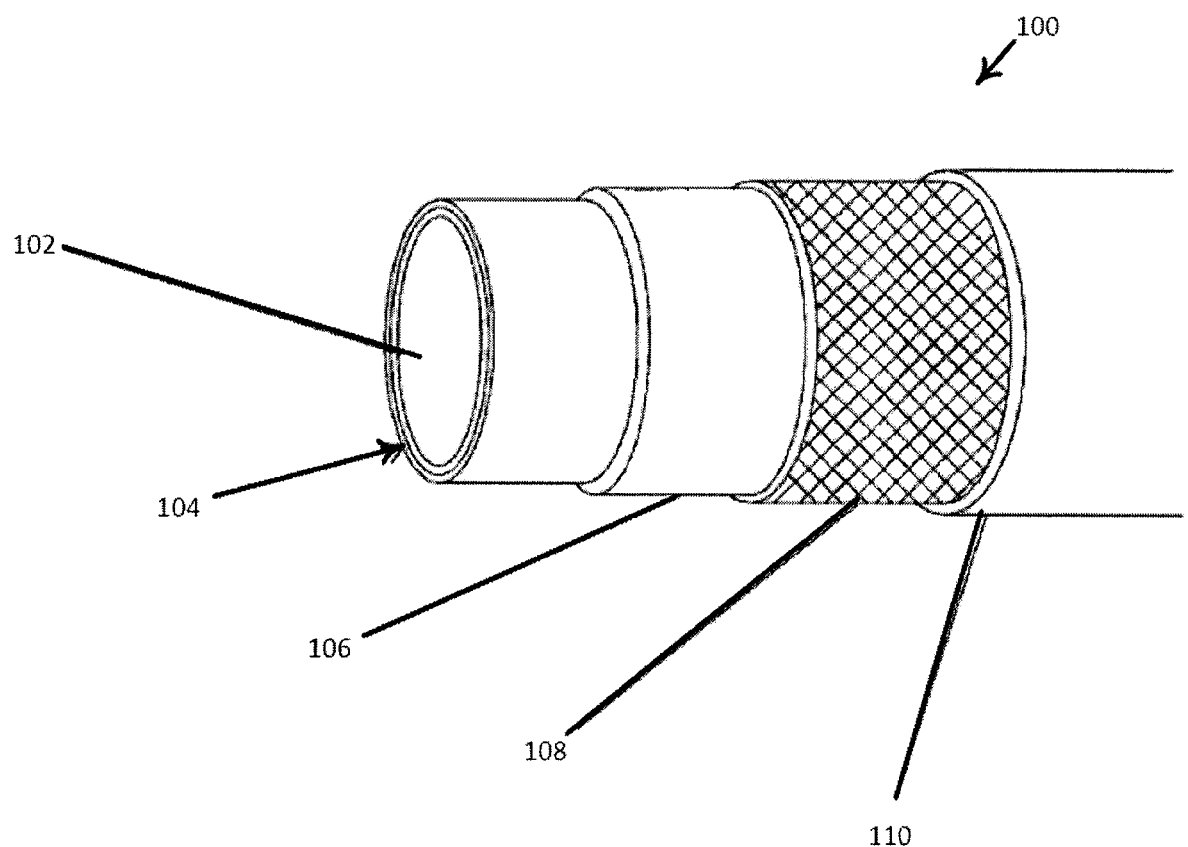
FIG. 1 is a schematic drawing of a fuel hose (100) according to an embodiment consisting essentially of (102) an inner tube layer, (104) a tie layer, (106) an outer core tube layer, (108) a reinforcement layer, and (110) an outer cover layer.

In some embodiments, a fuel hose is provided, as shown in FIG. 1, including five layers consisting of a chemically resistant inner tube layer (102); a tie layer (104); an outer core tube layer (106), a reinforcement layer (108) and an outer cover layer (110).

In some embodiments, a hose is provided having an Inner Tube Layer 102. In some embodiments, the inner tube layer 102 is prepared from a composition comprising a thermoplastic fluoropolymer, e.g., polyvinylidene difluoride (PVDF). In some embodiments, the PVDF is selected from a KYNAR® PVDF, e.g., KYNAR®2800-20, 2800-00, 2800-01, 2850-02 or 760 for extrusion fabrication (Arkema Inc., Philadelphia). In some embodiments, the thickness of the inner tube layer 102 is 0.2±0.07 mm, or 0.008±0.003 inches. In some embodiments, the I.D. of the Inner Tube Layer is selected from those known in the art, or as found at TABLE 2.

In some embodiments, a hose is provided having a Tie Layer Layer 104 prepared from a composition comprising TPU. In some embodiments, the tie layer is prepared from a composition comprising a polyester based TPU. In some embodiments, the tie layer is prepared from a composition TEXIN® 285 TPU (Bayer Materials Science), Shore hardness A 84-90 or BASF S90A TPU. In some embodiments, the thickness of the tie layer 104 is 0.2±0.07 mm, or 0.008±0.003 in.

In some embodiments, a hose is provided having an Outer Core tube layer 106 prepared from a composition comprising TPU. In some embodiments, the outer core layer is prepared from a composition comprising a polyether TPU and a colorant. In some aspects, the outer core layer is prepared from a composition comprising BASF ELASTOLLAN® 1185A TPU or 1195A TPU. In some embodiments, the outer core layer is prepared from a composition comprising a polyether TPU and a CPE colorant in from about 0.1-5 wt %, 1-3 wt %, or 2 wt %. In some embodiments, the outer core tube layer is prepared from a composition comprising a polyether TPU and CPE 1630 Black. In some embodiments, the thickness of the outer core tube layer 106 is about 0.038 in, or 0.97 mm.

In some embodiments, the fuel hose comprises a reinforcement layer 108. In some embodiments, as shown in FIG. 1, the reinforcement layer 108 comprises a textile. Examples of suitable textiles for the reinforcement layer 108 include aramid, polyester braid, nylon, cotton, and rayon. In some embodiments, the reinforcement layer 108 is a discontinuous layer. In some embodiments, the reinforcement layer 108 is a discontinuous layer comprising a polyester braid, aramid, nylon, cotton, or rayon. In some embodiments, the cover layer 110 and the outer core layer 106, migrate through the interstices of the textile in the reinforcement layer 108 and bond together. In a specific embodiment, the reinforcement layer 108 comprises a polyester, 1000 Denier white, in a discontinuous layer with picks/5" of 5.5±0.5.

In some embodiments, a fuel hose is provided comprising an Outer Cover layer 110. In some embodiments, the outer cover layer 110, is prepared from a composition comprising a polyvinyl chloride (PVC), a copolyester and a polyurethane (TPU), in a ratio of about 60-70/15-25/10-20 wt ratio of PVC/TPU/copolyester. In a specific embodiment, the PVC is PolyOne GEON™ vinyl flexible A75M1 Trans 9000 polyvinyl chloride (Masterbond®), the copolyester is HYTREL® 4056 (DuPont™) and the TPU is BASF ELASTOLLAN® 1185A. In some embodiments, a fuel hose is provided comprising an outer cover layer prepared from a composition comprising a PVC alloy. In some embodiments, the PVC alloy comprises a PVC, and a copolyester without TPU. In some embodiments, the PVC alloy comprises a PVC, a copolyester, and a TPU. In some embodiments, the PVC alloy comprises a PVC, a copolyester, a TPU and one or more colorants and/or UV stabilizers. In some embodiments, the PVC alloy comprises a flame retardant. In some specific embodiments, the outer tube layer has a wall thickness selected from 1.73, 1.78, or 1.91 mm; corresponding to 0.068, 0.070, or 0.075 inches.

According to an embodiment, a composition is provided that is suitable for preparing an outer cover layer for a fuel hose, or other hydraulic applications, comprising a PVC alloy or blend comprising PVC, a thermoplastic copolyester elastomer, and optionally a thermoplastic polyurethane. The combination of polymers benefits from the better processability and temperature performance of copolyester, and the flexibility and hydrolytic stability of polyurethane, as well as improved bonding to the outer core layer, compared to conventional fuel hose comprising an outer layer consisting essentially of PVC.

Fuel hose comprising one or more layers formed from a composition comprising (a) a copolyester; and (b) polyvinyl chloride (PVC) is provided. In some embodiments, the fuel hose comprises a multiplicity of layers including an outer cover layer formed from a composition comprising (a) copolyester; (b) PVC; and (c) thermoplastic polyurethane (TPU). In some embodiments, the compositions can be blends, alloys or co-polymers used for manufacturing fuel hose, including use in manufacturing an outer cover layer, or a tie layer.

In various embodiments, a fuel hose is provided herein meets performance requirements specified in SAE J1527-B1 and SAE J844. In various embodiments, a fuel hose is provided herein meets performance requirements specified in SAE J1527-B1 including Flammability, Burst Test, Vacuum Collapse, Cold Flex, Tensile and Elongation, Dry Heat Resistance, Oil Resistance, Fuel Resistance, Ozone Resistance, Adhesion Test-Cover to Core, Adhesion Test-Liner to Outer Core, and Permeation. In various embodiments, a fuel hose is provided herein meets performance requirements specified in SAE J844 including High Temperature Collapse Resistance, and Stiffness Testing. The test standards along with the required limits for fuel hose are listed in TABLE 1.

TABLE 1

USCG/SAE Standard Test Limits.

| Test | Standard | Requirements for Pass |
|---|---|---|
| Flammability | SAE J1527B1 | The flame shall be self-extinguishing within 60 seconds.* |
| Burst Test | SAE J1527B1 | For tubes having an ID less than 1", 175 psi is minimum burst (if maximum working pressure is less than or equal to 35 psi). |
| Vacuum Collapse | SAE J1527B1 | Diameter of the specimen shall not decrease by more than 20% during test. |
| Cold Flex | SAE J1527B1 | Hose shall not fracture or show any cracks, checks or breaks following −20° C. for 5 hrs upon bending around 3" mandrel |
| Tensile and Elongation | SAE J1527B1 | 1020 psi minimum for tensile strength (cover); 1160 psi minimum for tensile strength (tube); 200% minimum for ultimate elongation (for both tube and cover)* |
| Dry Heat Resistance | SAE J1527B1 | Samples* shall not have a reduction from originals of more than 20% for tensile strength or more than 50% for elongation. 1961 psi minimum for tensile strength (cover); 2533 psi minimum for tensile strength (tube); 175% minimum for ultimate elongation (cover); 201% minimum for ultimate elongation (tube) |
| Oil Resistance | SAE J1527B1 | Samples* shall not have a reduction in tensile strength or elongation of more than 40% when compared to the originals. Volumetric change of tube shall not exceed −5 to +25% when compared to unaged specimens. 1471 psi minimum for tensile strength (cover); 1900 psi minimum for tensile strength (tube); 210% minimum for ultimate elongation (cover); 241% minimum for ultimate elongation (tube) Volumetric change of cover shall not exceed 100% when compared to unaged specimens. |
| Fuel Resistance | SAE J1527B1 | Samples* shall not have a reduction in tensile strength or elongation from the originals of more than 60% or a volumetric change exceeding +60%. |
| Ozone Resistance | SAE J1527B1 | Tubing shall show no signs of fracture or cracking when examined under a 7x magnification after immersion sequence has terminated. |
| Adhesion Test-Cover to Core | SAE J1527B1 | The minimum load to separate a 25.4 mm (1 inch) width of tube and cover at room temperature per ASTM D 413 shall be 27N (6 lbf)* |
| Adhesion Test-Liner to Outer Core | SAE J1527B1 | The minimum load to separate a 25.4 mm (1 inch) width of tube and cover at room temperature per ASTM D 413 shall be 89N (20 lbf)* |
| Permeation | SAE J1527B1 | The permeation rate shall not exceed 15 g/m^2/24 hrs for any measurement. |
| High Temperature Collapse Resistance | SAE J844 | The tube should not show more than 20% collapse of the OD, or kinking following conditioning at 60° C. (140° F.) for 24 hours and cooling to room temp. |
| Stiffness Testing | SAE J844 | Average force required to deflect hose sample must not exceed 1.0 lbf greater than 1.34 lbf |

*Material test: one size represents whole family.

The shortcomings of the materials typically used for making fuel line can be overcome by combining polymers with different properties in a composition (e.g., a blend, alloy or co-polymer) that fulfills the regulatory requirements set by the SAE and DOT.

Figure 2A:
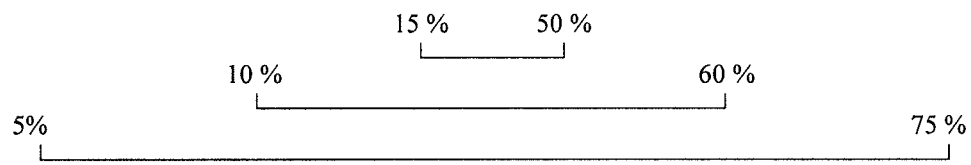
FIG. 2A shows copolyester concentration ranges used in compositions for forming a fuel hose body layer.
Figure 2B:
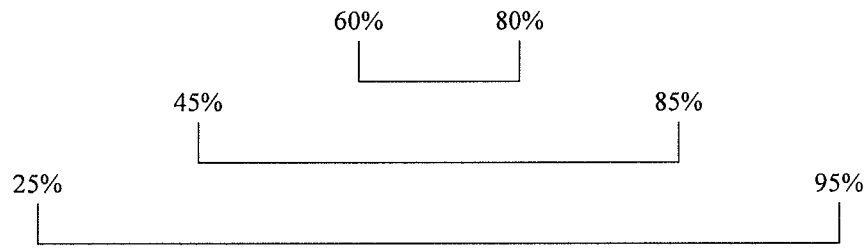
FIG. 2B shows PVC concentration ranges used in compositions for forming a fuel hose body layer.
Figure 2C:
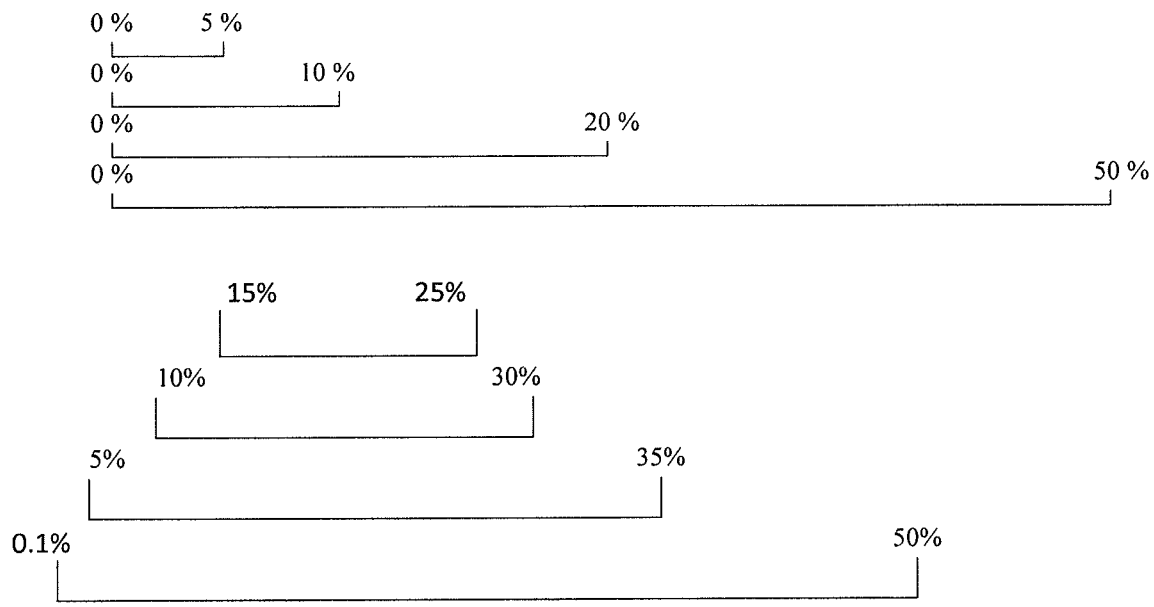
FIG. 2C shows thermoplastic polyurethane (TPU) concentration ranges used in compositions for forming a fuel hose body layer.

Referring to FIGS. 2A through 2C, ranges of components for compositions which may be blends or alloys used for preparation of an outer cover layer of a hose according to the disclosure are provided. The ranges were selected to maintain the improved temperature performance. The more copolyester in the, the stiffer, and less flame retardant the blend becomes; but the better the bond to a TPU, for example, in an outer core layer.

In some embodiments, a hose is provided comprising a multiplicity of layers wherein one or more hose body layers is prepared from a composition comprising a copolyester and a PVC, and optionally comprising a polyurethane (TPU). FIG. 2A shows embodiments wherein the composition for forming the hose layer, such as a tie layer or an outer cover layer, comprises one or more copolyesters in an amount from about 5-75, 10-60, or 15-50 wt % copolyester compared to the weight of the unfilled composition.

In other embodiments, a hose is provided comprising a multiplicity of layers wherein one or more hose body layers is prepared from a composition comprising a copolyester, a PVC and a TPU, wherein the copolyester is present in the composition at from about 5-30 wt %, 10-25 wt %, or 12-17 wt % copolyester. In certain embodiments, a hose is provided comprising an outer cover layer prepared from a composition comprising PVC and 15-25 wt %, or 17-23 wt % of a copolyester. In other embodiments, a hose is provided comprising an outer cover layer prepared from a composition comprising PVC and 40-60 wt %, or 45-55 wt % of a copolyester.

In some embodiments, the copolyester is selected from one or more thermoplastic copolyester elastomers (TPC-ES). In some embodiments, the composition comprises a copolyester combination of a hard segment of polyester (e.g., PBT) and a soft segment of polyethers or polyester. In some embodiments, the copolyester can impart stiffness under high temperature conditions. In some embodiments, the copolyester is a thermoplastic copolyester polyether based elastomer. In some embodiments, the copolyester is an extrusion grade copolyester elastomer. In some embodiments, the copolyester is selected from any low modulus extrusion grade thermoplastic copolyester elastomer.

In some embodiments, the copolyester is selected from a commercially available copolyester, for example, from Dupont or DSM Engineering Plastics, Inc. In some embodiments, the copolyester is a thermoplastic polyester elastomer selected from a DuPont™ HYTREL® polyether block copolymer or DuPont™ HYTREL® RS, for example, HYTREL® 4056, 4068, 4069, G4074, G4774, or G5544; or ARNITEL® (DSM Engineering Plastics, Inc.) CM551, CM600-V, CM622, UM551, UM551-V, or UM552; or another commercially available extrusion grade thermoplastic copolyester elastomer.

Copolyesters of varying hardness can be used. In some embodiments, the copolyester, exhibits a durometer reading of about 30D-63D on the Shore scale, or about 40D-55D, or about or about 40D. In some embodiments, two known durometers of copolyester are combined in the composition, for example, 40D and 55D. Different types of copolyesters, or blends, alloys or co-polymers including one or more of such materials may be used.

As shown in FIG. 2B, in some embodiments, a hose is provided comprising a layer, such as a tie layer or an outer cover layer, prepared from a composition comprising approximately 25-95 wt % PVC, or approximately 45-85 wt % PVC, or approximately 60-80 wt % of one or more PVCs. PVC or "polyvinyl chloride" as used herein will be understood to cover the range of homo- and copolymer resins of vinyl chloride. Any PVC certified for fuel hose applications (R1 Type B Class 1) under SAE J 1527 requirements is acceptable. The PVC is selected from a commercially available PVC, for example a grade PVC such as a flexible polyvinyl chloride such as PolyOne Geon™ vinyl flexible A75M1 Trans 9000 polyvinyl chloride (Masterbond®), or a Teknor Apex™ flexible PVC, or any fuel grade PVC may be selected.

As shown in FIG. 2C, in some embodiments, a hose is provided comprising a multiplicity of layers, including a layer, such as a tie layer, or an outer cover layer, prepared from a composition comprising approximately 0.1-50 wt %, or approximately 5-35 wt %, or approximately 10-30 wt %, or 15-25 wt % of one or more polyurethanes, compared to the total weight of the unfilled composition.

In other embodiments, a hose is provided comprising a multiplicity of layers wherein one or more hose body layers is prepared from a composition comprising a copolyester, a PVC and a TPU, wherein the TPU is present in the composition at from about 5-25 wt %, 10-20 wt %, or 12-17 wt % copolyester.

In some embodiments, the polyurethane is a thermoplastic polyurethane (TPU) is selected from one or more TPUs. A polyurethane is a polymer composed of organic units joined by carbamate (urethane) links. Polyurethane polymers are generally formed by reacting an isocyanate with a polyol. The isocyanates and polyols contain on average two or more functional groups per molecule. Thermoplastic polyurethanes (TPUs) are thermoplastic elastomers that can exist in a molten state when subject to heat. TPUs consist of linear segmented block copolymers composed of hard and soft segments. TPUs are formed, for example, from three components: (a) diisocyanates, (b) short chain diols (chain extenders); and (3) long chain bifunctional diols (polyols). The hard block is constructed from a chain extender and isocyanate and can impart the TPU with toughness and physical performance properties. The soft block is constructed from a polyol and an isocyanate and can impart flexibility and elastomeric character to the TPU. Various TPU properties can include elasticity, transparency, and resistance to oil, grease, and abrasion.

In some embodiments, the polyurethane is a polyether-based polyurethane. In some embodiments, the thermoplastic polyurethane (TPU) is a commercially available TPU. In some embodiments, the TPU is selected from a commercially available polyether-based polyurethane selected from a BASF Elastollan® TPU or a Huntsman TPU. In some embodiments, for example, the TPU is a polyether-based TPU selected from BASF 1185A (Shore hardness 85A), or BASF 1195A (Shore hardness 95A). In some embodiments, the polyurethane is a polyester-based polyurethane. In some embodiments, a hose layer is prepared from a composition comprising TPU that is a polyester based TPU, e.g., TEXIN® 285 (Bayer Materials Science), Shore hardness A 84-90.

Polyurethanes of varying hardness can be used. For example, in some embodiments, the polyurethane exhibits a Shore Hardness, of about 85-95A. Different types of polyurethane may be used, such as for example a polyester or a polyether type or blends, alloys or co-polymers that include polyurethane. In some embodiments, a hose is provided comprising an outer cover layer prepared from a composition without a polyurethane.

In one embodiment, a hose is provided comprising an outer cover layer prepared from a composition comprising 25-95 wt % PVC, and 5-75 wt % copolyester.

In another embodiment, a hose is provided comprising an outer cover layer prepared from a composition comprising 45-55 wt % PVC, and 45-55 wt % copolyester.

In certain embodiments, a hose is provided comprising an outer cover layer prepared from a composition comprising 60-70 wt % PVC, 15-25 wt % TPU and 10-20 wt % copolyester.

In specific embodiments, a hose is provided comprising an outer cover layer prepared from a composition comprising 63-67 wt % PVC, 18-22 wt % TPU and 13-18 wt % copolyester.

In another embodiment, a hose is provided comprising an outer cover layer prepared from a composition comprising 45-55 wt % PVC, 20-35 wt % TPU and 15-30 wt % copolyester.

In another embodiments, a hose is provided comprising an outer cover layer prepared from a composition comprising 48-52 wt % PVC, 25-33 wt % TPU and 23-27 wt % copolyester.

Fuel hose sizes can vary with slightly different requirements for each size. For example, typical fuel hose sizes include nominal inside diameter (I.D.) of ¼" (6.4 mm), 5/16" (7.9 mm), ⅜" (9.5 mm), ½" (12.7 mm), and ⅝" (15.9 mm), with corresponding nominal outer diameter (O.D.) of 0.64" (16.3 mm), 0.70" (17.8 mm), 0.77" (19.6 mm), 0.89" (22.6 mm), and 1.01" (25.7 mm).

In some embodiments, a fuel hose is provided comprising a multiplicity of layers including an outer cover layer prepared from a composition comprising a polyvinyl chloride (PVC), a copolyester and, optionally a polyurethane (TPU), wherein the dimensions of the hose are selected from nominal inside diameter (I.D.) of ¼" (6.4 mm), 5/16" (7.9 mm), ⅜" (9.5 mm), ½" (12.7 mm), and ⅝" (15.9 mm), with corresponding nominal outer diameter (O.D.) of 0.64" (16.3 mm), 0.70" (17.8 mm), 0.77" (19.6 mm), 0.89" (22.6 mm), and 1.01" (25.7 mm).

In some embodiments, a fuel hose is provided comprising a multiplicity of layers including an outer cover layer prepared from a composition comprising a polyvinyl chloride (PVC), a copolyester and, optionally a polyurethane (TPU), wherein the dimensions of the hose are selected from TABLE 2.

TABLE 2

| | Fuel Hose Dimension Embodiments | | | | | |
|---|---|---|---|---|---|---|
| Reference | I.D. (in.) | I.D. (mm) | O.D. ref (in.) | O.D. ref (mm) | Wall thickness (in.) | Wall thickness (mm) |
| -40 | 0.250 ± 0.008 | 6.35 ± 0.2 | 0.490 | 12.45 | 0.123 ± 0.01 | 3.12 ± 0.25 |
| -50 | 0.312 ± 0.008 | 7.93 ± 0.2 | 0.560 | 14.22 | 0.124 ± 0.01 | 3.15 ± 0.25 |
| -51 | 0.320 ± 0.008 | 8.13 ± 0.2 | 0.565 | 14.35 | 0.123 ± 0.01 | 3.12 ± 0.25 |

TABLE 2-continued

Fuel Hose Dimension Embodiments

| Reference | I.D. (in.) | I.D. (mm) | O.D. ref (in.) | O.D. ref (mm) | Wall thickness (in.) | Wall thickness (mm) |
|---|---|---|---|---|---|---|
| −60 | 0.375 ± 0.008 | 9.53 ± 0.2 | 0.625 | 15.88 | 0.125 ± 0.01 | 3.17 ± 0.25 |
| −61 | 0.350 ± 0.008 | 8.89 ± 0.2 | 0.600 | 15.24 | 0.125 ± 0.01 | 3.17 ± 0.25 |

In some embodiments, a fuel hose is provided comprising a multiplicity of layers including an outer cover layer prepared from a composition comprising a polyvinyl chloride (PVC), a copolyester and, optionally a polyurethane (TPU), wherein the wall thickness of the hose is selected from 2.5-3.6, 2.8-3.5, or 2.9-3.3 mm.

In some embodiments, a fuel hose is provided comprising a multiplicity of layers wherein I.D. (mm) is selected from 6.35 (6.15-6.55), 7.9 (7.73-8.12), 8.1 (7.93-8.33), 9.5 (9.33-9.72), or 8.9 (8.69-9.09); with corresponding O.D. (mm) 12.45 (0.49), 14.22 (0.56), 14.35 (0.56), 15.88 (0.62), or 15.24 (0.60), respectively.

In some embodiments, a hose is provided comprising a multiplicity of layers including an outer cover layer prepared from a composition comprising a polyvinyl chloride (PVC), a copolyester and, optionally a polyurethane (TPU), wherein the maximum concentricity, total indicated runout (T.I.R.), I.D. to O.D., is selected from 0.24-0.26, or 0.25.

In some embodiments, the composition comprises other additives such as heat and light stabilizers, impact modifiers, lubricants, wetting agents, antioxidants, pigments, dyes, colorants, colorings, or opacifying agents such as for coloring-coding of the hose, luminescents, light reflectants, chain extending oils, tackifiers, blowing agents, foaming or anti-foaming agents, reinforcements such as glass, carbon, or textile fibers, and fire retardants such as halogenated compounds, metal oxides and salts, The additives may be in liquid, powder, particulate, flake, fiber, or other form. The impact modifier may be a maleic anhydride (MAH) grafted polyolefin (Fusabond®, Dupont), or an ethylene/methacrylic copolymer-based ionomer resin such as Suryln®, (DuPont, Wilmington, Del.), or other ethylene copolymer resin which may be a high-molecular-weight copolymer resin such as an EVACO (ethylene/vinyl acetate/carbon monoxide), EBACO (ethylene/butyl acrylate/carbon monoxide), or EnBAGMA (ethylene/n-butyl acrylate/glycidyl methacrylate) terpolymer resin (Elvaloy®, Dupont). The heat age stabilizer, in turn, may be a hindered amine, or a proprietary additive such as "EI" from DSM Engineering Plastics (Evansville, Ind.). Typically, the optional additives are blended or otherwise admixed with the composition, and may comprise between about 0.01 wt % and 10 wt %; or between about 0.05 wt % and 5 wt %; or between about 0.1 wt % and 3 wt %. In some specific embodiments, the fuel hose comprises an outer cover layer formed from a composition comprising about 0.1-3 wt % of a heat and/or light UV stabilizer.

In some embodiments, a plasticizer can be employed to increase flexibility and cold impact resistance. In some embodiments, the concentration of plasticizer in the composition may be very low. For example, as shown in FIG. 2F, the composition may comprise approximately 0-8 wt %, or approximately 0-4 wt %, or as little as approximately 0-1 wt % plasticizer. In some embodiments, the composition comprises a plasticizer at approximately 0.1-8 wt %, or approximately 0.3-6 wt %, or approximately 0.5-4 wt % compared to the weight of the unfilled composition. Conventional plasticizers known in the art may be used.

In some embodiments, a hose is provided comprising a layer prepared from a composition comprising PVC, a copolyester and optionally a polyurethane, wherein the composition is unfilled. In some embodiments, the composition comprises one or more fillers. In some embodiments, the composition comprises one or more fillers selected form intercalated graphite particles, borates, siloxanes, phosphates, glass, hollow or solid glass or elastomeric microspheres, silica, silicates, mica, carbon black and the like. Typically, the optional fillers are blended or otherwise admixed with the base polymeric material, and may comprise between about 0.1% and 80% by weight compared to the weight of the unfilled composition.

In some embodiments, a fuel hose is provided comprising an outer cover layer prepared from a composition comprising about 10-20 wt % copolyester; 60-70 wt % PVC and about 15-25 wt % polyurethane. In specific embodiments, the fuel hose is prepared from a composition comprising about 17-22 wt % copolyester; about 63-68 wt % PVC, and 17-22 wt % polyurethane.

In some embodiments, a fuel hose is provided comprising an outer cover layer prepared from a composition comprising about 75-85 wt % fuel grade PVC and; about 15-25 wt % copolyester. In specific embodiments, a fuel hose is provided comprising an outer cover layer prepared from a composition comprising about 78-82 wt % fuel grade PVC and; about 17-23 wt % copolyester.

In some embodiments, the fuel hose comprises at least two layers including an inner tube layer that is chemically resistant, and an outer layer prepared from a composition comprising a polyvinyl chloride (PVC), a copolyester and, optionally a polyurethane (TPU), in a ratio of about 60-70/15-25/10-20 wt ratio of PVC/TPU/copolyester.

In a specific embodiment, FIG. 1 represents a hose 100 consisting of five layers, including an inner tube layer 102 prepared from a composition comprising polyvinylidene difluoride (PVDF); a tie layer 104 prepared from a composition comprising TPU; an outer core tube layer 106 prepared from a composition comprising TPU, a reinforcement layer 108 comprising a woven polyester fiber, and an outer cover layer 110, prepared from a composition that is a blend or alloy comprising a polyvinyl chloride (PVC), a copolyester and a polyurethane (TPU), in a ratio of about 60-70/15-25/10-20 wt ratio of PVC/TPU/copolyester. In a specific embodiment, the PVC is PolyOne GEON™ vinyl flexible A75M1 Trans 9000 polyvinyl chloride (Masterbond®), the copolyester is HYTREL® 4056 (DuPont™), and the TPU is BASF ELASTOLLAN® 1185A.

In another specific embodiment, FIG. 1 represents a hose 100 consisting of five layers, including an inner tube layer 102 prepared from a composition comprising polyvinylidene difluoride (PVDF); a tie layer 104 prepared from a composition comprising TPU; an outer core tube layer 106 prepared from a composition comprising TPU, a reinforcement layer 108 comprising a woven polyester fiber, and an outer cover layer 110, prepared from a composition that is a blend or alloy comprising a polyvinyl chloride (PVC), and a copolyester in a ratio of about 45-55/45-55 wt ratio, 75-85/25-35 wt ratio, or 60-70/30-40 wt ratio of PVC/copolyester. In a specific embodiment, the PVC alloy is prepared from a composition comprising a polyvinyl chloride (PVC), and a copolyester in a ratio of about 45-55/45-55 wt ratio of PolyOne GEON™ vinyl flexible A75M1 Trans 9000 polyvinyl chloride (Masterbond®), and HYTREL® 4056 copolyester (DuPont™).

Figure 3:
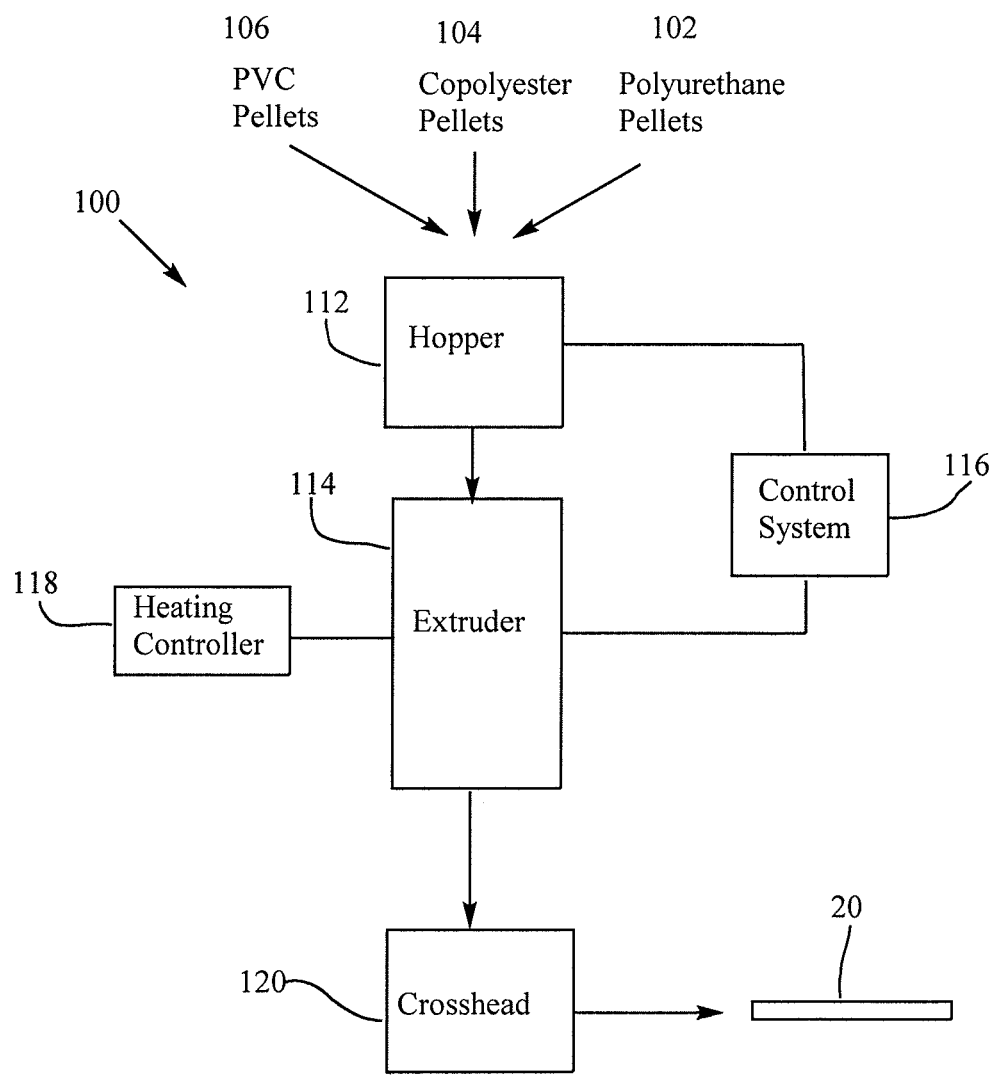
FIG. 3 shows a schematic drawing of an extrusion system used to make a fuel hose according to an embodiment.

An exemplary method for making a fuel hose is illustrated in FIG. 3. Hose 20 comprised of a layer formed from the composition may be manufactured on an extrusion system 100 as shown in FIG. 3. The extrusion system 100 may include, among other components, a hopper 112, an extruder 114 (e.g., an auger or screw type extruder), a control system 116, a heating controller 118 and a crosshead 120. The components (polyurethane pellets 102, copolyester, pellets 104 and PVC pellets 106) used to make the fuel hose 20 can be metered into a hopper 112 controlled by the control system 116. The components 102, 104, 106 may be in pellet form or any other suitable form. The components 102, 104, 106 can be at least partially mixed in the hopper 112 and then fed into the extruder 114 where the components 102, 104, 106 are further mixed and heated with heat supplied by one or more heating elements of the extruder controlled by the heating controller 118. The components 102, 104, 106 may be under pressure prior to or when exiting the extruder 114 into the cross head 120. The cross head 120 may include a tip and a die (not shown) to form the body of the fuel hose 20. After the extrusion process the fuel hose 20 may be cooled (e.g., by using a cooling bath) and gathered on a take-up reel. Mixing the components 102, 104, 106 and extruding them directly into fuel hose 20 without additional heating steps may be beneficial because an additional heating step and therefore degradation of the composition can be avoided. Alternatively it may be desirable in some circumstances to mix and extrude the components 102, 104, 106 to form pellets comprising the composition that can then be formed into fuel hose 20 at a later time using the extrusion system 100. In certain examples, the composition can be a co-polymer, alloy or blend.

In some embodiments, a method for making a fuel hose is provided, wherein the hose is manufactured in-line, in a single manufacturing process, or is manufactured in two or more discreet steps, comprising wherein the core is made in a first place and/or time, and jacketed at a second place and/or period of time. In some embodiments, a method for making a fuel hose is provided comprising extrusion with pressure tooling or draw down tooling. In some embodiments, a method for making a fuel hose is provided comprising mixing a PVC, a copolyester and optionally a TPU, wherein the mixing is selected from blending on line, or compounding the PVC, copolyester and optionally the TPU in a secondary step. In some embodiments, the secondary step comprises compounding the PVC, copolyester and optionally the TPU to form a pellet.

Fuel hose of the present embodiments may possess superior qualities as compared to existing products by having increased burst strength, reduced moisture absorption, increased elevated temperature burst strength, increased tensile strength both before and after thermal conditioning.

EXAMPLES

The present examples provide standards, and test results for embodiments of the disclosure. Applications include fuel delivery lines for small engines, petroleum-based chemicals, bio-diesel fuel to 100% and marine fuel lines.

Fuel hose prepared according to the disclosure was tested under a number of SAE standard conditions. Unless otherwise specified in the individual tests, test fluid used was MIL-PRF-2104 lubricating oil or equivalent, water; pressure tolerances were ±0.7 bar (±10 psi); and ambient and fluid temperatures were between 23° C.±3° C. (73° F.±5° F.).

Example 1 provides standards, descriptive protocols and test results for a hose prepared in accordance with FIG. 1 including an inner tube layer prepared from a composition comprising polyvinylidene difluoride (PVDF); a tie layer prepared from a composition comprising TPU; an outer core tube layer prepared from a composition comprising TPU, a reinforcement layer comprising a woven polyester fiber, and an outer cover layer prepared from a composition comprising a polyvinyl chloride (PVC), a copolyester and a polyurethane (TPU), in a ratio of about 60-70/15-25/10-20 wt ratio of PVC/TPU/copolyester. Dimensions of test hose are shown in TABLE 2.

The embodied hose meets or exceeds test standards as provided herein. Hose and hose assemblies covered by this standard are suitable for use with gasoline fuel with operating pressures provided herein and within operating temperature of –40° C. to 71° C. (–40° F. to 160° F.). This hose is CARB approved and conforms to parts of SAE J1527, B1 and SAE J30 R6, R9 and R11 specification.

Example 1

A. SAE J1527-B1 Permeation Test. Prepare 3 samples of proper length. Plug one end of each sample to a depth of 1 inch using the impermeable plug and hose clamp. Measure the active length (L) between the ends of the nipple and the end of the plug on the hose sample. Fill reservoir with 300 ml of test fuel. Seal reservoir unit. To insure complete filling of the tube, orient the test sample vertically and gently tap to loosen air bubbles. Weigh reservoir assembly to the nearest 0.01 g and record. Place reservoir in a position to insure tube is filled throughout the test and not in contact with any surface. Storage location should be temperature controlled to 73° F.±3.6° F. (23° C.±2° C.) with free flowing air to prevent fume build-up. Continue to soak the fuel tube in this configuration for 4 weeks. Drain reservoir and immediately refill with 300 ml of fresh test fuel. Seal reservoir unit. To insure complete filling of the tube, orient the test sample vertically and gently tap to loosen air bubbles. Weigh reservoir assembly to the nearest 0.01 g and record. Place reservoir in a position to insure tube is filled throughout the test and not in contact with any surface. Storage location should be temperature controlled to 73° F.±3.6° F. (23° C.±2° C.) with free flowing air to prevent fume build-up. Weigh assembly each 24 hour±0.5 hour for 15 days or until a peak has been established, recording each weight reading. After each weight, invert the sealed assembly to drain the sample. Return to test position, taking care to refill the hose and remove any air.

Report permeation rate as the highest 24 hour weight loss in grams during the test period. The permeation rate shall not exceed 15 g/m^2/24 hrs for any measurement.

Results: Average permeation of 6 samples was 6.2 grams/m^2/day. CARB Certification Completed, and EPA Certification Completed.

Example 1B

SAE J1527-B1 Flammability Test. Briefly, remove cover from tube. Cut ¼" wide strip longitudinal from the tube cover. A Bunsen burner shall be used to start burning of the strips until approximately ½" of strip is burning vigorously. Remove the burning strip from the flame and hold it horizontally with the outside facing upward. Conduct in a draft free environment. The average time of at least six determinations shall be used. The flame shall be self-extinguishing within 60 seconds. Results: For n=6, Average Time to extinguish: 20 sec. Pass.

Example 1C

SAE J1527-B1 Burst Test. Condition samples at room temperature for 24 hours prior to burst. Assemble fittings to the end of specimen per manufacturer's recommendations. Burst samples per SAE J343, (15 to 30 seconds for burst result). Repeat test for 4 samples total and record burst values (psi). Per SAE J1527, tubes having an ID less than 1", 175 psi is minimum burst (if maximum working pressure is less than or equal to 35 psi). If maximum working pressure is greater than 35 psi, then 4 times maximum working pressure is minimum for burst acceptability. Thus, each hose size, −40, −50, −51, −60, −61 is tested under operating pressure 13.8 bar (200 psi), minimum burst pressure 55.2 bar (800 psi). Results: For n=4, Average Free Hose Burst: 940 psi.

Example 1D

SAE J1527-B1 Vacuum Collapse Test. Condition samples at room temperature for 24 hours prior to evaluation. If needed, assemble fittings to the end of specimen per manufacturer's recommendations. A length of tube or tube assembly shall be held in a straight line. A 20 in Hg vacuum shall be applied for no less than 15 seconds and no more than 60 seconds. Diameter of the specimen shall not decrease by more than 20% during test. Results: Ball passed freely.

Example 1E

SAE J1527-B1 Cold Flex Test. Tubing is placed in a freezer at −20° C. for 5 hours, then bent around a mandrel with a 3.0" diameter. Hose shall not fracture or show any cracks, checks or breaks. Results: For n=6, All samples Passed at 1.5" bend radius and −40° C.

Example 1F

SAE J1527-B1 Tensile and Elongation Test. Conduct the tensile strength testing per ASTM D638 using a pull rate of 1" per minute. Record tensile strength and ultimate elongation in the table below. 1020 psi minimum for tensile strength (cover); 1160 psi minimum for tensile strength (tube); 200% minimum for ultimate elongation (for both tube and cover). Results: For n=6, Cover exhibited Tensile: 2,442 psi; and Elongation: 464%. Tube exhibited Tensile: 4,689 psi, and Elongation: 248%.

Example 1G

SAE J1527-B1 Dry Heat Resistance Test. Expose samples to dry heat aging for 70 hours minimum at 100° C.±2° C. (212° F.±3.6° F.). Conduct the tensile strength testing per ASTM D638 using a pull rate of 1" per minute. Record tensile strength and ultimate elongation in the table below. Samples shall not have a reduction from originals of more than 20% for tensile strength or more than 50% for elongation. 1961 psi minimum for tensile strength (cover); 2533 psi minimum for tensile strength (tube); 175% minimum for ultimate elongation (cover); 201% minimum for ultimate elongation (tube). Results: For n=6, Change in Cover was Tensile: −0.25%, and Elongation: −11.84%. Change in Tube was Tensile: −4.20% and Elongation: −15.17%.

Example 1H

SAE J1527-B1 Oil Resistance Test. Immerse tubing in ASTM IRM 903 oil at 212° F.±6° F. (100° C.±2° C.) for 70 hours. Remove and allow to cool at room temperature for 30 minutes. Wipe any excess oil from tubing assembly. Conduct the tensile strength testing per ASTM D638 using a pull rate of 1" per minute. Record tensile strength and ultimate elongation in the table below. Samples shall not have a reduction in tensile strength or elongation of more than 40% when compared to the originals. Volumetric change of tube shall not exceed −5 to +25% when compared to unaged specimens. 1471 psi minimum for tensile strength (cover); 1900 psi minimum for tensile strength (tube); 210% minimum for ultimate elongation (cover); 241% minimum for ultimate elongation (tube) Volumetric change of cover shall not exceed 100% when compared to unaged specimens. Results: For n=6, Change in Cover wasTensile: 6.29%; Elongation: 2.42%; and Volume Swell: 4.68%. Change in Tube was Tensile: −10.64%; Elongation: −14.26%; and Volume Swell: 15.50%.

Example 1I

SAE J1527-B1 Fuel Resistance Test. After 48 hours immersion at 73° F.±3.6° F. (23° C.±2° C.) per AStm D 471 in the test fuel, remove and wipe any excess fuel from tubing. Conduct the tensile strength testing per ASTM D638 using a pull rate of 1" per minute. Record tensile strength and ultimate elongation in the table below. Samples shall not have a reduction in tensile strength or elongation from the originals of more than 60% or a volumetric change exceeding +60%. Results: For n=6, Change in Cover was Tensile: 52.65%; Elongation: 15.06%; and Volume Swell: 39.06%. Change in Tube was Tensile: 58.35%; Elongation: −6.02%; and Volume Swell: 43.24%.

Example 1J

SAE J1527-B1 Ozone Resistance Test. Use a cylinder having a diameter that is eight times the nominal outside diameter of the tube, bind the tube 360° around the cylinder. In the case where the tubing specimen is shorter than the circumference of the cylinder, bend the tube so that as much of its length as possible is in contact with the cylinder. Condition the tube assembly in air at room temperature for 24 hours. Immediately thereafter, condition the tube assembly for 70 hours in an exposure chamber having an ambient air temperature of 104° F. (40° C.) during the test sequence and containing air mixed with ozone in the proportion of 100 parts ozone per 100 million parts of air by volume. Remove tubing assembly from and inspect for cracks under 7-power magnification. Ignore areas immediately adjacent to or within the area covered by binding. Tubing shall show no signs of fracture or cracking when examined under a 7× magnification after immersion sequence has terminated. Results: For n=3, all samples passed.

Example 1K

SAE J1527-B1 Adhesion Test—Cover to Core. For the backing test sequence, shave a point on the ends of each half of specimen. Work to start the backing layer separating from remaining core. Set tensile machine at a rate of 1" per minute of travel. Affix section of hose that has been separated from the sheath into lower jaws of tensile machine. Zero tensile machine. Affix sheath that has been separated from core into top jaws of tensile machine. Start pull. After a distance of 3 inches has been separated, stop test and record the maximum lbf recorded over the entire pulling sequence. If sheath tears during test, repeat prep work to test sheath again. If the layer cannot be separated, mark "inseparable" in the appropriate space. The minimum load to separate a 25.4 mm (1 inch) width of tube and cover at room temperature per ASTM D 413 shall be 27N (61 bf). Results: For n=6, Cover Adhesion was 25.43 lbf/in.

Example 1L

SAE J1527-B1 Adhesion Test—Liner to Outer Core. Slice specimen into 2 halves using razor fixture secured in vise. Shave a point on the ends of each half of specimen. Work to start the liner layer separating from 2nd layer. Set tensile machine at a rate of 1" per minute of travel. Affix section of hose that has been separated from the liner into lower jaws of tensile machine. Zero tensile machine. Affix liner that has been separated from remaining specimen into top jaws of tensile machine. Start pull. After a distance of 3 inches has been separated, stop test and record the maximum lbf recorded over the entire pulling sequence. If liner tears during test, repeat prep work to test liner again. If the layer cannot be separated, mark "inseparable" in the appropriate space. The minimum load to separate a 25.4 mm (1 inch) width of tube and cover at room temperature per ASTM D 413 shall be 89 N (20 lbf). Results: For n=5, average Liner Adhesion was 29.91 lbf.

Example 1M

SAE J844 High temperature collapse resistance test. Using a new assembly, place a reference mark at the middle of each sample and measure the minor diameter and record. Carefully install samples completely over the pins of the holding fixture so that the tubes are bent 180 degrees to its minimum bend radius of 1.5 in. The tube shall be bent in the direction of the natural curve, if present. Condition the holding device and tubing samples in an air oven at 60° C. (140° F.) for 24 hours. Remove holding device with tube samples and allow to cool to room temperature for 30 minutes minimum. While samples are on test fixture, measure minor diameter at the reference mark to determine final outside diameter. Calculate the percentage collapse of the outside diameter of the tubing. The tube should not show more than 20% collapse of the OD, or kinking. Each hose size, −40, −50, −51, −60, −61 is tested. Results: For n=6, Maximum Collapse at 1.5" bend and 60° C.=5.03%.

Example 1N

SAE J844 Stiffness Testing. The hose support pins shall be set to the position specified per SAE J844. The hose is to lie across the pins and a force is applied in the middle of the hose per SAE J844. The test shall be run at the specified loading rate to a deflection of 50.8 mm (2.0 in.) and then the crosshead should unload the sample at the same rate (Load Rate: 1 in/min). The deflection is measured downward from an imaginary line connecting the tops edges of the rollers. Each sample shall be tested in the direction of the natural bend of the hose, then rotated by 90 degrees, and then against the natural bend of the hose. The time between tests on a sample of the hose is to be less than 60 seconds. The gage length shall not be reset between the tests of the same hose sample. The displacement and load shall be output with time. Average force required to deflect hose sample must not exceed 1.0 lbf greater than 1.34 lbf. Results: Average Force to Deflect: 0.858 lbf. A comparative sample, comprising an outer cover layer prepared from a composition consisting essentially of PVC, exhibited an average stiffness of 1.34 lbf.

The hose tested in Example 1 comprising a jacket prepared from a PVC alloy of PVC/copolyester/TPU exhibits the required cover adhesion while maintaining the necessary flexibility and adhesion—all while showing significant improvements in terms of performance when compared to the control sample with a jacket constructed essentially of PVC.

In addition, the hose of Example 1 meets and/or exceeds SAE J1527-B1 flammability test requirements, wherein the hose exhibits the ability to self-extinguish flames in not more than 60 seconds, not more than 45 seconds, and/or not more than 30 seconds.

Further, the hose of Example 1 meets and/or exceeds SAE J1527-B1permeation test requirements for permeation rate, wherein the hose exhibits an average permeation rate not greater than 15 g/m^2/24 hrs, or preferably not more than 10 grams/m^2/day permeation rate when tested according to SAE J1527-B1.

Example 2

Fuel hose prepared according to FIG. 1 was prepared and tested in the following protocols.

A hose according to FIG. 1 was prepared and tested. Accordingly, the hose of Example 2 consists of five layers, including an inner tube layer prepared from a composition comprising polyvinylidene difluoride (PVDF); a tie layer prepared from a composition comprising TPU; an outer core tube layer prepared from a composition comprising TPU, a reinforcement layer comprising a woven polyester fiber, and an outer cover layer prepared from a composition that is a PVC alloy comprising a ratio of about 45-55/45-55 wt ratio of PVC/copolyester. In addition, the hose of Example 2 consists of five layers prepared by a method comprising extrusion with pressure tooling as opposed to the draw down tooling used in preparation of the comparative example hose comprising an outer cover layer consisting essentially of PVC.

Dimensions of test and comparative hose tested was O.D. 0.600 ref; I.D. 0.350±0.005 in; Liner thickness 0.008±0.002; tie layer thickness 0.006±0.002; core thickness 0.036±0.005; core O.D. 0.45 ref; total wall 0.125±0.01; liner TIR 0.004 max; tie layer TER 0.003 max; core TIR 0.004 max and total TIR 0.010 max.

Example 2A

Strip Adhesion according to SAE J1527, Section 14.0. High Humidity and Heat. This test was performed to determine the bond strength between the thermoplastic cover and core over time when subjected to heat and humidity.

Test samples were prepared from prototype constructions & the control construction and cut to length at 3". Samples were aged accordingly at 70% RH and 120° F. 5 samples of each construction are to be pulled from the chamber once a week for 4 weeks and tested for layer adhesion according to listed procedure. If the layer cannot be separated, mark "inseparable." Acceptance criteria is Minimum load to separate either the liner or the backing layers to be 6 lbf/linear inch. Results are shown in TABLE 3. After 2 weeks at 70% RH and 120° F., the comparative hose fails the strip adhesion test, while the Test hose exhibits acceptable adhesion over the four week period of the test.

TABLE 3

High Humidity and Heat Strip Adhesion Test Results.

|  | Baseline | Week 1 | Week 2 | Week 3 | Week 4 |
|---|---|---|---|---|---|
| Test Hose (avg) | 23.55 | 21.38 | 22.37 | 22.09 | 21.11 |
| std. dev. | 2.53 | 3.88 | 3.39 | 2.38 | 2.79 |
| Comparative Example (avg) | 33.06 | 36.98 | 36.55 | fail | fail |
| std. dev. | 10.47 | 4.53 | 2.13 |  |  | fail = could not test.

Example 2B

Strip Adhesion according to SAE J1527, Section 14.0. Submerged Cover Test. This test was performed to determine the bond strength between the thermoplastic cover and core. Obtain tubing specimens from prototype constructions & the control construction and cut to length at 3." Samples were aged by submerging in water. Two samples per week were tested for 3 weeks.

Protocol: Slice specimen into 2 halves using razor fixture secured in vise. Shave a point on the ends of each half of specimen. Work to start the core separating from the cover. Set tensile machine at a rate of 1" per minute of travel. Affix section of hose that has been separated from the liner into lower jaws of tensile machine. Zero tensile machine. Affix liner that has been separated from remaining specimen into top jaws of tensile machine. Start pull. After a distance of 3 inches has been separated, stop test and record the maximum lbf recorded over the entire pulling sequence. If the cover tears during test, repeat prep work to test the cover again.

If the cover cannot be separated, mark "inseparable." Acceptance criteria was Minimum load to separate either the liner or the backing layers to be 6 lbf/inch. Results are shown in TABLE 4. Both Test and Comparative example passed test.

TABLE 4

Submerged Strip Adhesion Test Results

|  | Week 1 N = 4 | Week 2 N = 2 | Week 3 N = 2 | Week 4 N = 2 |
|---|---|---|---|---|
| Test Hose (avg) | 23.55 | 25.38 | 19.84 | 23.17 |
| std. dev. | 2.53 | 2.64 | 0.94 | 4.57 |
| Comparative Example (avg) | 33.06 | 38.68 | 34.22 | 35.86 |
| std. dev. | 10.47 | 2.16 | 2.96 | 1.29 |

Example 2C

Cold Flex Test SAE J1527, Section 9.0. This test provides hose characteristics after low temperature exposure. Test samples were cut to 18.75"±0.25" inches in length.

Protocol: Expose the tubing specimen in a freezer set at −20° C.±2° C. (−4° F.±3.6° F.) for 5 hours minimum. Also, at the same temperature, expose a mandrel having a diameter equal to 10 times the maximum outside diameter of the tubing being evaluated. Note table below. Immediately following this exposure and while tube and mandrel are in the freezer, bend tubing 180 degrees over the mandrel at a steady rate, accomplishing the bending motion within 4 seconds.

Repeat the test for all samples at −30° C.±2° C. (−22° F.±3.6° F.), −35° C.±2° C. (−31° F.±3.6° F.), & −40° C.±2° C. (−40° F.±3.6° F.). Three samples each were tested under each condition and time point.

Acceptance Criteria provides that the tubing shall show no visible evidence of fracture, cracks, checks or breaks. Proof pressure of 99 psi may be applied to determine tube damage. Results are shown in TABLE 5. Both comparative example control and Test hoses passed at −20° C. (−4° F.) with no change upon visual evaluation. However, at colder temperatures to Comparative Example control became very stiff, while the test hose had no change in appearance. During cold temperature flexing, the test hose maintained flexibility and did not crack at −40° C. (40° F.).

TABLE 5

Cold Flex Test.

|  | −20° C. (−4° F.) | −30° C. (−22° F.) | −35° C. (−31° F.) | −40° C. (−40° F.) |
|---|---|---|---|---|
| Test Hose Appearance | No Change Pass | No Change Pass | No Change Pass | No Change Pass |
| Comparative Example Appearance | No Change Pass | Very Stiff Pass | Very Stiff Pass | Very Stiff Pass |

Results for each of three samples tested

Example 2D

High Temperature Collapse Test SAE J844. This test is performed to determine the bond strength between thermoplastic layers.

Obtain tubing specimens from each prototype constructions to obtain 3 samples, each at a length of 14.3" (363 mm) for MBR=2.0" & 12.7" (322.6 mm) for MBR=1.5".

Protocol: Place a reference mark at the middle of each sample and measure the cross section diameter (Unbent OD) at this point and record. Carefully install the samples on a bend test fixture in a 180-degree bend condition. The tube shall be bent in the direction of natural curvature of the tube. Samples shall be bent to a radius equal to the minimum bend radius called out. Age samples on test fixture for 24 hours at 49° C. (120° F.). Allow the samples to cool to room temperature. While the samples are on the test fixture, measure the OD at the reference mark (Bent OD). Repeat the test for all samples at 60° C. (140° F.), 71° C. (160° F.), & 93° C. 200° F.), Record results.

$$\% \text{ Loss} = [(\text{Unbent OD}) - (\text{Bent OD})/(\text{Unbent OD})] \times 100$$

Collapse greater than 20% is considered a failure. Results: The Test hose consistently passed the high temperature collapse with a bend radius of 1.5" (38.1 mm) at an elevated temperature of 71° C. (160° F.).

The hose tested in Example 2 comprising a PVC/copolyester jacket exhibits the required cover adhesion while maintaining the necessary flexibility all while showing significant improvements in terms of performance when compared to the control sample with a jacket constructed essentially of PVC.

From the forgoing detailed description, it will be evident that modifications and variations can be made without departing from the spirit and scope of the disclosure.

What is claimed is:

1. A method for making a fuel hose comprising
a hose body comprising a multiplicity of layers including an outer cover layer formed from a composition comprising
75 wt % of a thermoplastic copolyester elastomer;
25-95 wt % of a polyvinyl chloride (PVC); and
5-35 wt % of a thermoplastic polyurethane (TPU),
the method comprising
mixing the thermoplastic copolyester elastomer; the polyvinyl chloride (PVC), and the thermoplastic polyurethane (TPU) to form the composition,
wherein the fuel hose is capable of meeting the performance requirements according to SAE J1527-B1, exhibits the ability to self-extinguish flames in not more than an average of 60 seconds, and wherein the fuel hose exhibits a minimum bend radius of 1.5" in the SAEJ1527-B1 cold flex test.

2. The method for making the fuel hose according to claim 1, wherein the fuel hose does not exceed a permeation rating of 15 g or less of fuel loss per square meter of interior surface area in 24 hours, 15 g/m2/24 h, with CE fuel at 23° C. as specified in SAE J1527-B1.

3. The method for making the fuel hose according to claim 1, wherein the fuel hose exceeds the criteria of the flammability test according to SAE J1527-B1, and exhibits the ability to self-extinguish flames in not more than an average of 40 seconds, or 30 seconds.

4. The method for making the fuel hose according to claim 1, wherein the hose body comprises reinforcement.

5. The method for making the fuel hose according to claim 1, wherein the fuel hose has a multi-layer construction.

6. The method for making the fuel hose according to claim 1, wherein the composition comprises about 10-60 wt % by weight copolyester, 45-85 wt % PVC, and 10-30 wt % TPU.

7. The method for making the fuel hose according to claim 6, wherein the composition comprises about 10-20 wt % by weight copolyester, 60-70 wt % PVC, and 15-25 wt % TPU.

8. The method for making the fuel hose according to claim 1, wherein the composition is a blend, alloy or copolymer.

9. The method for making the fuel hose according to claim 1, wherein the mixing comprises blending the PVC, the copolyester and the TPU on line in an extrusion system, or compounding the PVC, the copolyester and the TPU is a secondary step.

10. The method for making the fuel hose according to claim 9, wherein the secondary step comprises
compounding the PVC, the copolyester and the TPU to form a mixture, and
extruding the mixture to form pellets comprising the composition.

11. The method for making the fuel hose according to claim 9, wherein the extrusion system comprises a hopper, an extruder, a control system, a heating controller, and a crosshead.

12. The method for making the fuel hose according to claim 11, wherein the mixing comprises
at least partially mixing the PVC, the copolyester, and the TPU in the hopper to form a mixture; and
feeding the mixture into the extruder.

13. The method for making the fuel hose according to claim 12, further comprising
heating the mixture in the extruder to form a blend; and
extruding the blend through the cross head to form the at least one layer of the fuel hose.

14. The method for making the fuel hose according to claim 13, wherein the extruding comprises pressure tooling or draw down tooling.

15. The method for making the fuel hose according to claim 1, wherein the hose body comprises
an inner tube layer prepared from a composition comprising polyvinylidene difluoride (PVDF);
a reinforcement layer; and
the outer cover layer formed from the composition.

16. The method for making the fuel hose according to claim 15, wherein the hose body further comprises
an outer core tube layer prepared from a composition comprising a TPU disposed between the inner tube layer and the reinforcement layer.

17. The method for making the fuel hose according to claim 16, wherein the hose body further comprises
a tie layer prepared from a composition comprising a TPU disposed between the inner tube layer and the outer tube layer.

18. The method for making the fuel hose according to claim 17, wherein the hose body comprises
an inner tube layer prepared from a composition comprising polyvinylidene difluoride (PVDF);
a tie layer prepared from a composition comprising TPU;
an outer core tube layer prepared from a composition comprising TPU;
a reinforcement layer comprising a woven polyester fiber; and
the outer cover layer prepared from a composition comprising a polyvinyl chloride (PVC), a copolyester and a polyurethane (TPU), in a ratio of about 60-70/15-25/10-20 wt ratio of PVC/TPU/copolyester.

19. The method for making the fuel hose according to claim 18, wherein the hose is suitable for use with gasoline fuel within operating temperature of −40° C. to 71° C. (−40° F. to 160° F.).

* * * * *